July 30, 1968 J. ADAMSKI 3,394,962
CONVERTIBLE TOP MECHANISM
Filed Dec. 7, 1966 5 Sheets-Sheet 2
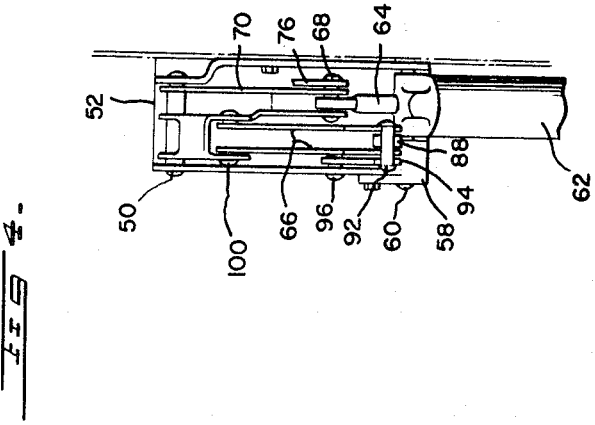
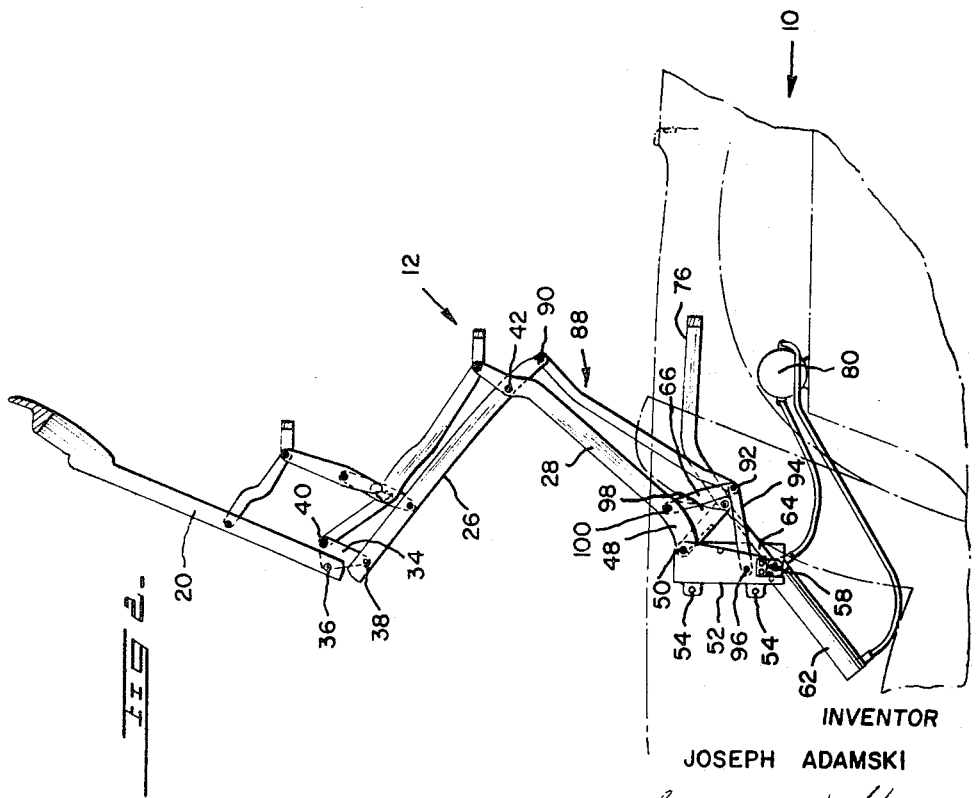
INVENTOR
JOSEPH ADAMSKI
BY *Stowell & Stowell*
ATTORNEYS

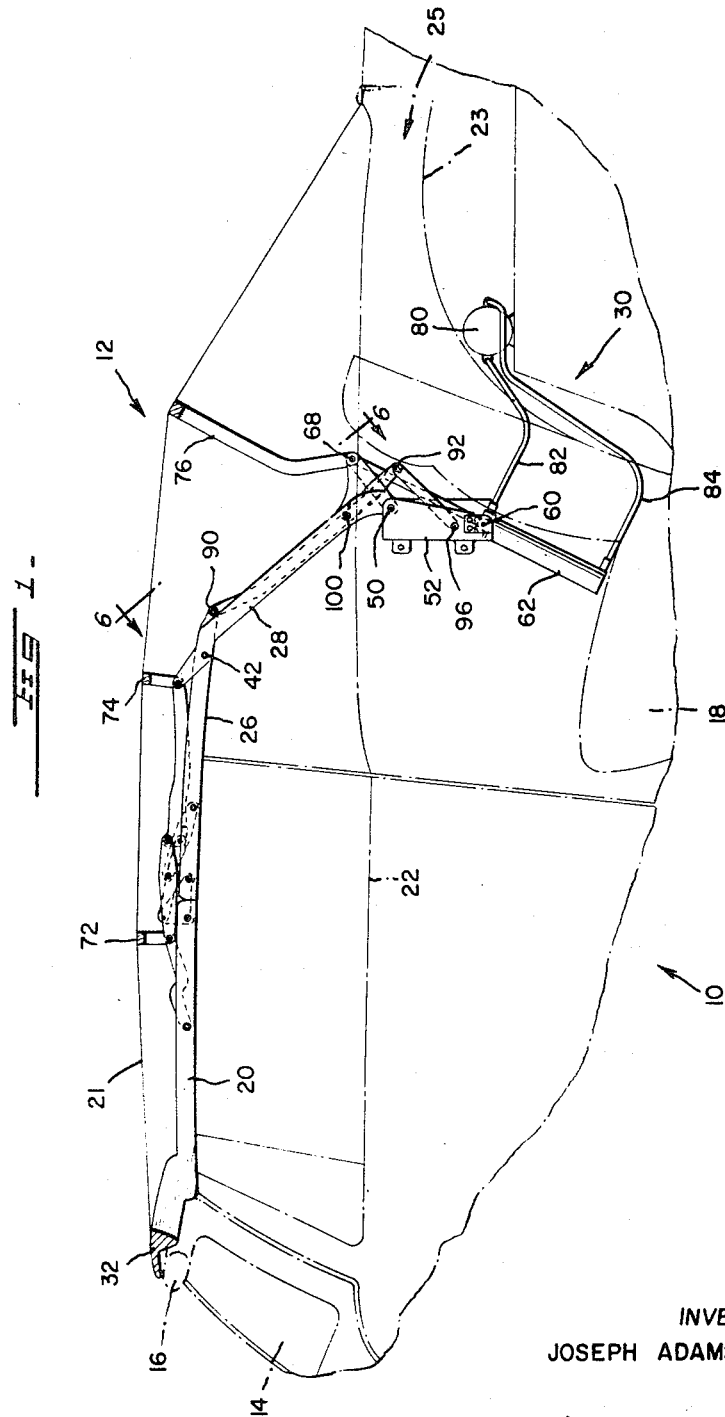

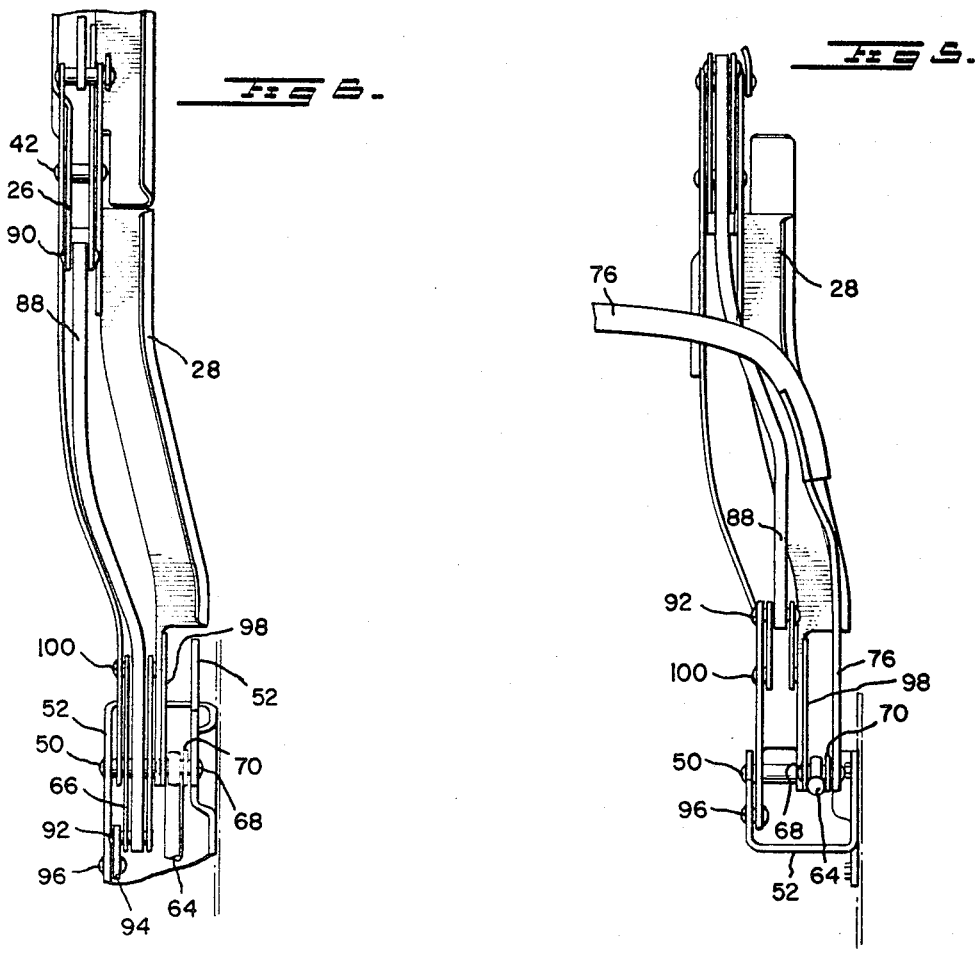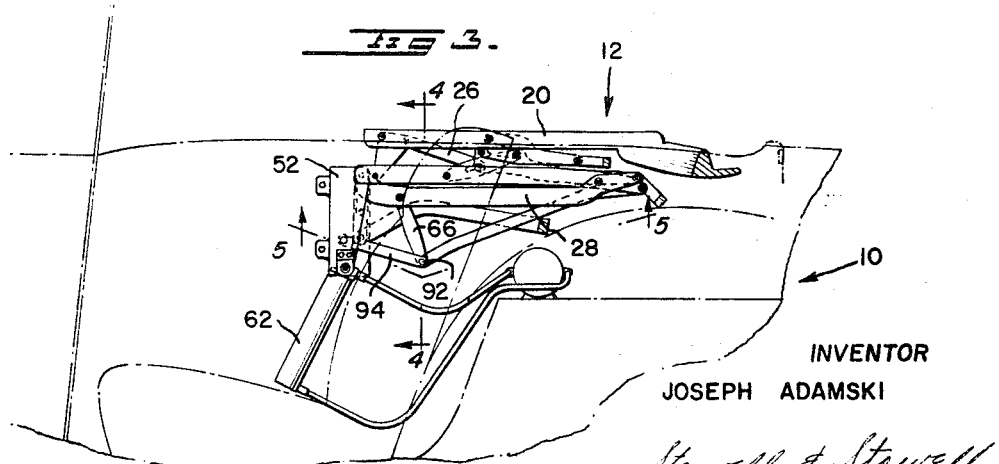

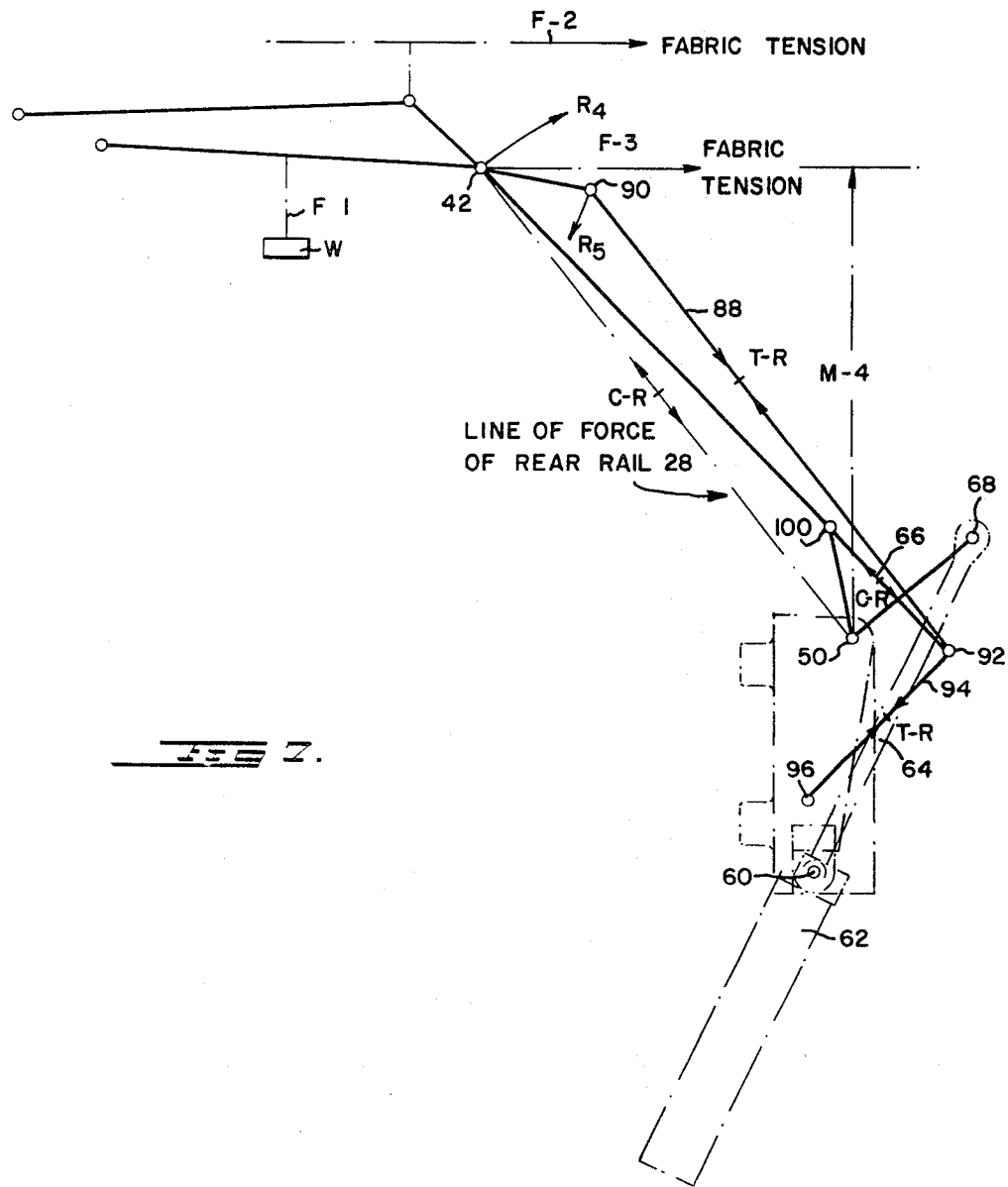

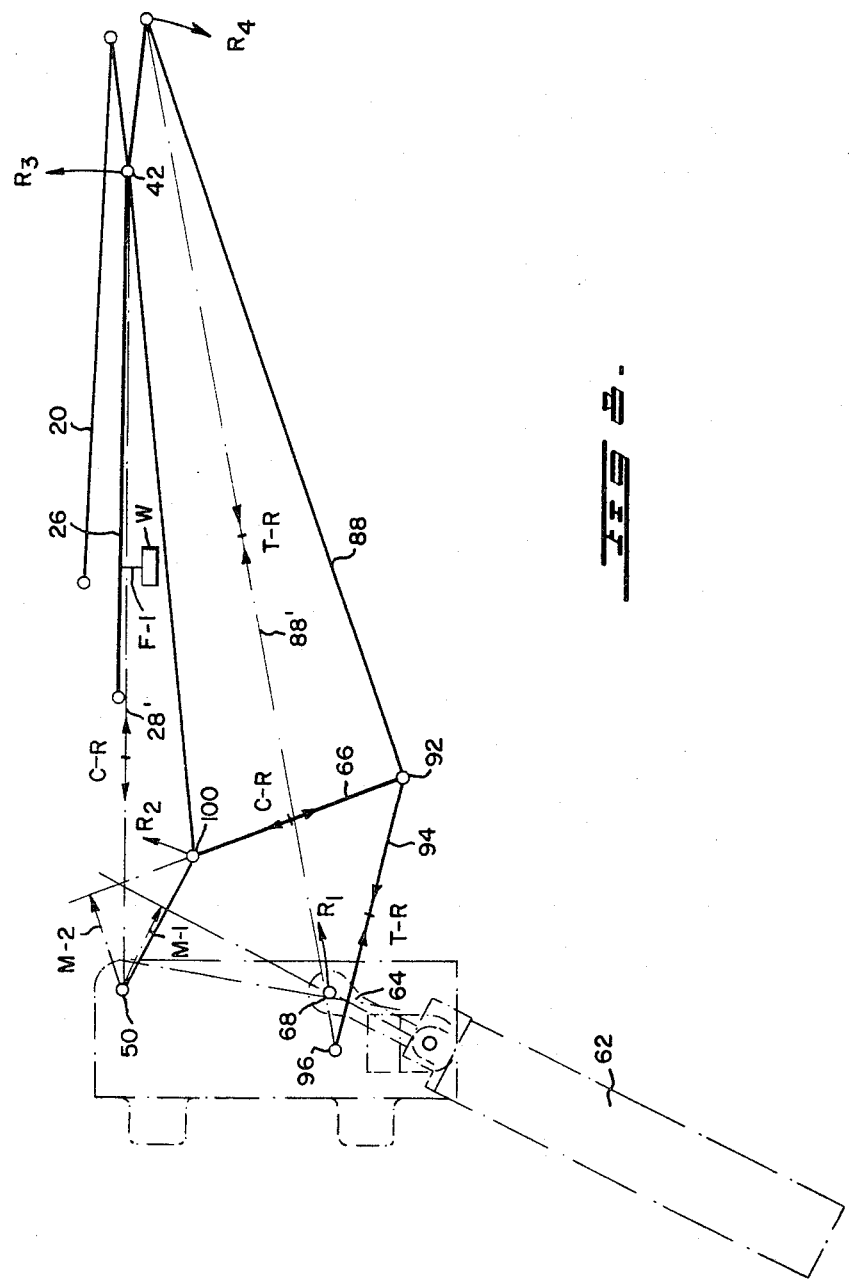

3,394,962
CONVERTIBLE TOP MECHANISM
Joseph Adamski, Brooklyn, Mich., assignor, by mesne assignments, to Dura Corporation, Oak Park, Mich., a corporation of New York
Filed Dec. 7, 1966, Ser. No. 599,846
3 Claims. (Cl. 296—117)

This invention relates to an improved folding top mechanism for vehicles and in particular to a convertible top mechanism wherein the control link is provided with a toggle linkage therein and means are associated with the toggle linkage for controlling the toggle joint thereof.

It is the current practice in the automotive industry to lower the window or belt line and to enlarge the area of rear side windows of convertible vehicles. Therefore a folding top mechanism is required which moves through an arc substantially greater than 90° and one that rises sharply vertically from its folded and stored position to permit the top mechanism to clear the enlarged side rear windows.

With the advent of hard glass rear windows in convertibles the fabric of a top on a car body must be stretched to a much higher degree of tautness in order to suspend the glass fore and aft without benefit of supplementary props. This, in addition to the required tautness for folding tops of a low silhouette, creates a severe demand on the mechanical framework to thrust the top header forward onto the body windshield for easy latching. Due to such a required thrust forward, counter-rotational forces of the top framework about the lower rear rail pivot cannot be tolerated.

It is, therefore, a principal object of this invention to so arrange the required forces for sufficient tensing of the control link that these forces shall not work adversely on the rear rail to the thrusting forward of the top mechanism against the fabric tension and onto the body windshield header.

It is a further object of the present invention to provide a folding top mechanism which will accomplish a high degree of travel and will permit the use of large rear side windows in convertible vehicles.

It is a further object of the present invention to provide a convertible top actuating mechanism including means for tensioning the control link which will not introduce counter-rotational forces on the main or rear lever of the actuating mechanism.

Another object is to provide an improved convertible top mechanism which will readily accept hard glass rear windows which are currently replacing the lightweight flexible plastic windows of prior art convertible vehicles.

Further objects are to provide a folding top structure for a convertible motor vehicle which is relatively simple in construction, relatively light in weight, easy to assemble and which may be installed as a preadjusted assembly in a vehicle body.

These and other objects and advantages are provided by a convertible top actuating mechanism comprising a plurality of acticulately interconnected members including for each side thereof a front rail, a side rail and a rear rail, means pivotally connecting the rear end of the front rail and the forward end of the center rail, means pivotally connecting the rear rail and the center rail intermediate their ends, means connecting the lower end of the rear rail to the vehicle body, an actuator, means mounting one element of the actuator to the vehicle body, means pivotally connecting another element of the power actuator to the lower end of the rear rail at a point spaced from the pivotal connection between the rear rail and the vehicle body, a control link, means pivotally connecting one end of the control link to the rear end of the center rail, a control link extension, means pivotally connecting the other end of the control link and one end of the control link extension, means pivotally connecting the other end of the control link extension to the vehicle body, and means for controlling the pivotal connection between the control link and the control link extension.

The invention will be more particularly described and other objects and advantages will be apparent from the following detailed description of the invention when considered in light of the drawings wherein:

FIGURE 1 is a vertical section through one side of the operating linkage of a convertible top shown in the extended position with certain portions of the vehicle body omitted and other portions shown in phantom;

FIGURE 2 is a fragmentary view of the structures shown in FIGURE 1 with the top in an intermediate position between its extended and its folded positions.

FIGURE 3 is a view similar to that illustrated in FIGURE 2 with a folding top mechanism in the fully retracted or folded position;

FIGURE 4 is an enlarged fragmentary sectional view on line 4—4 of FIGURE 3;

FIGURE 5 is an enlarged fragmentary sectional view on line 5—5 of FIGURE 3;

FIGURE 6 is an enlarged fragmentary view substantially on line 6—6 of FIGURE 1 of the drawings;

FIGURE 7 is a diagrammatic view illustrating the forces on the primary members of a convertible top mechanism constructed in accordance with the teachings of the present invention with the top in the extended position; and FIGURE 8 is a diagrammatic view similar to FIGURE 7 illustrating the forces on the primary members of the convertible top in the folded position.

Referring to the drawings and FIGURES 1, 2 and 3 in particular, a vehicle body 10 is shown in phantom lines and is provided with a folding top structure 12.

The vehicle body 10 is shown sufficiently to identify the windshield 14 having a header bar 16 and a rear seat 18 behind which is provided the trunk area and space 25 receptive of the folding top 12 in its fully retracted and stored position. The vehicle belt line 22 and rear wheel housing 23 are also shown and identified for general reference purpose.

In the subsequent discussion of the folding top 12 and the operative mechanism thereof, reference made to the "forward" or "rearward" disposition of any member, or the use of like terms, is to be understood as with regard to the position thereof with respect to the front or back ends of the vehicle 10 on which the top is provided.

The top structure 12 includes articulated side frame rails and interconnected cross-bows which form a framework over which a fabric cover 21 is extended. The side frame rails are each made up of a front side frame rail section 20, a center side frame rail section 26 and a rear side frame rail section 28. The articulated side frame rails are symmetrically opposite and are power operated by actuating means 30.

As will be appreciated, the actuating means 30 are interconnected for synchronous operation and are mounted on the vehicle body.

The front side rail sections 20 have a top header 32 provided across their forward ends and formed for engagement with the windshield header bar 16. A pivot plate member 34 is connected to the rear end of the front side rail section 20 and to the forward end of the center side rail section 26. The pivot plate is triangular in shape with spaced pivot connections 36 and 38 for engagement with the front and center side rail sections 20 and 26, respectively, and with a third pivotal connection 40 disposed apart therefrom for connection to an operating link in a manner described in my Patent 3,180,675 dated Apr. 27, 1965.

The center side rail section 26 is connected to the pivot plate 34, as mentioned, and includes a pivotal connection 42 near its rear end providing engagement with the rear side rail section 28.

The rear side rail section 28 is pivotally connected to the center rail section 26 at 42, as mentioned, and is formed to provide a generally downwardly disposed end 48 which is pivotally connected at 50 to a support bracket 52.

The support structure 52 is generally U-shaped in transverse cross section and fasteners 54 attach the support structure 52 to the inner surface of a weldment of the vehicle body structure. The U-shaped bracket 52 includes plate 58, FIGURE 4, which is attached to the bracket 52 by fasteners and this extension forms a yoke and trunnion pivot support 60 for the hydraulic cylinder 62 which serves as the linear power actuator.

The cylinder 62 is provided with a piston not shown and a piston rod 64. The extended end of the piston rod 64 is pivotally mounted to a wing extension 98 of the rear rail 28 by a pivot pin 68. It will be particularly noted that a short link 70 is also connected to pivot pin 68 and extends to the pivotal connection 50 between the bracket 52 and the rear rail 28.

The link 70 as more clearly shown in FIGURE 4 provides stabilization for the rear rail and prevents twisting moments being set up in the rear rail at the point of power application to the convertible top structure by the piston rod 64.

The convertible top mechanism also includes a front bow 72, an intermediate 74 and a rear bow 76. The lower end of the rear bow is pivotally connected to the pivot pin 68 which connects the extended end of the piston rod 64 to the rear rail 28 as more clearly shown in FIGURE 4 of the drawing.

Power for the hydraulic cylinder 62 is provided by a motor and pump assembly 80 connected to the upper and lower ends of the cylinder 62 by hydraulic lines 82 and 84. The motor and pump assembly 80 is conventionally connected to a suitable source of electrical energy through a conventional switch not shown in the drawings whereby when the motor is actuated in one direction the piston rod 64 is extended and when the motor is reversed hydraulic fluid enters the upper end of the cylinder retracting the piston rod.

The assembly also includes a control link generally designated 88. The upper end of the control link is connected to the extended end of the center rail 26 at pivotal connection 90. The lower end of the control link 88 is pivotally connected at pivot pin 92 to the upper end of a control link extension 94. The lower end of the control link extension 94 is pivotally connected at 96 to the bracket 52 which also has pivotally connected thereto the rear rail 28 and the hydraulic cylinder 62.

It will be particularly noted that the connections adjacent the upper and lower ends of the control link extension and the control link form a toggle joint. Control of the toggle joint 92 is via a joint control rod 66. In the illustrated form of the invention control rod 66 comprises a spaced pair of rods with control link and control link extension mounted therebetween. One end of each of the joint control rods 66 is pivotally connected at pivot pin 92, of the toggle joint to be controlled, while the opposite end is pivotally connected by pin 100 to the rear rail 28 intermediate its pivotal connection to the center rail 26 at the pivot pin 42 and the pivotal connection between the rear rail and the bracket at pivot pin 50. In FIGURES 2 and 3 it will be seen that the toggle joint control rods 66 are generally normal to the rear rail 28 when the roof is fully retracted and when the roof is in its intermediate position of retraction. However, as illustrated in FIGURE 1, the joint control rods are substantially parallel to the rear rail when the roof is fully extended whereby the control link 88 is nested or concealed within the U-form of the rear rail 28 and between the pair of rods 66 thus adding to the advantages of the present invention. This nesting is also shown in FIGURE 6 of the drawing which is taken along line 6—6 of FIGURE 1 with the roof fully extended.

Now referring to FIGURE 3 of the drawing with the top fully retracted and with pressure fluid being directed to the lower end of the cylinder 62 force is applied to the pivot 68 between the extended end of the piston rod 64 and the wing portion 98 of the rear rail tending to rotate the rear rail in an arc about pivotal connection 50 of the rear rail to the bracket 52. However, with the center rail and the front rail nested on top of the rear rail and the control link connected to the extended end of the center rail 26 at pivot 90, there is provided a toggle lock-out condition. The force applied by the piston rod to the rear rail causes an upward swinging motion of the front rail 20 and of the side rail 26 with the primary motion of the side rail 26 being a rotative motion about pivot 42 to thereby extend the center and front rails so that the top is urged into a position as illustrated in FIGURE 2 prior to the time that the primary motion is transferred to the rear rail 28 to rock the entire assembly forwardly. Thus large side rear windows in the vehicle will be cleared by the top structure as continued rotation of the rear rail and associated or coordinated movement in the control link, the control link extension and the toggle link control rods 66 urges the roof in the fully extended position as illustrated in FIGURE 1 with the control link rods 66 lying substantially parallel to the control link 88 and to the rear rail 28 in a uniquely concealed position to thereby provide a cleaner less obstructed interior for the convertible vehicle.

In reverse operation of the power actuator, as the top approaches the final storage position illustrated in FIGURE 3 of the drawings, the joint control rods 66 place tension on the control link which in turn locks the rear rail, the center rail and the top rail in a rattle free folded configuration. Further, the tensioning brought about by the joint control rods 66 is effective to provide a portion of the power requirements during the initial movement of the center rail and the front rail during roll out of the folding top structure. Since the force required to tension the control link is applied to the rear rail, via the control rods 66 which are pivotally connected to the rear rail at pivot 100, in a normal direction of movement of the rear rail during erection of the roof there is no counter rotational forces applied to the main or rear rail, as was common in prior art structures.

The advantages of the present invention are particularly well illustrated in FIGURES 7 and 8 wherein the primary static and dynamic forces are illustrated together with positions and directions of movement of the primary linkages.

Referring specifically to FIGURE 7, wherein reference characters corresponding to those employed in FIGURES 1 through 6 have been used, the structures are illustrated in the top fully extended position. With the top substantially fully extended, there is a force F–1 caused by the weight W of the members of the top acting in the illustrated direction together with forces F–2 and F–3, acting in the illustrated directions, due to fabric tension. The fabric tension creates a counter rotation R–4 about pivot 42 in the illustrated direction. Thus pivot 42 is urged along path R–4 at force moment M–4 to rotate the top off of its header. This moment M–4 is counteracted by the weight W of the top and the force of the actuator 62–64 acting on pivot 68. Since the weight W of the top must be supported about pivot 42 it is necessary to rotate pivot 90 about pivot 42 in the direction R–5. To remove any effect by the control link 88 to rotate the rear rail 28 about the pivot 50, in the direction R–4, the control link 88 is tensed and under compressive resistances (CR) to the rear rail by its connection to the rear rail via control rod 66 at connections 92 and 100. Control link extension 94 acts in tension resistance (TR) between pivots 92 and 96 to the extent of positioning the pivot 92 substantially in line with pivots 100 and 90. When pivot 92 is so positioned the tension resistance (TR) of the control link extension 94 becomes substantially zero. Therefore all the tension resistance (TR) of the control link 88 acts only on the rear rail 28 in counter action to its compression resistance CR such that there is no counter effect upon the rear rail along rotation R-4 when the top is fully extended.

Referring particularly to FIGURE 8, wherein reference characters corresponding to those employed in FIGURES 1 through 7 have been used, the structures are illustrated in the top folded position. In the folded position the force F-1, caused by the weight W of the members of the top acts in the direction indicated and the control link 88 and the control link extension 66 remain under tensile resistance (TR) while the rear rail 28 and the control rod 66 remain under compression resistance (CR); however, between the full open and the folded positions of the top the tensile resistance in the control link 88 and in the control rod 66 shift their points of force application from the pivot 100 to the pivot 96. It will be noted that the line of tensile resistance of control link 88 is illustrated by line 88' and the line of compressive resistance of rear rail 28 is illustrated by line 28'.

Application of force by the linear actuator 62 at pivot 68 results in a rotational tendency R-1 of pivot 68 and corresponding rotational tendencies R-2 at pivot 100, R-3 at pivot 42 and R-4 at pivot 90 which causes an upward swinging motion of the front rail 20 and of the side rail 26 with the primary motion of the side rail 26 being a rotative motion about pivot 42. After the initial unfolding of the front and side rails the primary motion is transferred to the rear rail 28 which rocks forward about pivot 50 and the tensile resistance in the control link 88 and in the control rod 66 shift their points of force application from pivot 96 to the pivot 100.

I claim:

1. A convertible vehicle top actuating mechanism comprising a plurality of articulately interconnected members including for each side thereof a front rail, a side rail and a rear rail, means pivotally connecting the rear end of the front rail and the forward end of the center rail, means pivotally connecting the rear rail and the center rail intermediate their ends, means connecting the lower end of the rear rail to the vehicle body, an actuator, means mounting one element of the actuator to the vehicle body, means connecting another element of the power actuator to the lower end of the rear rail at a point spaced from the pivotal connection between the rear rail and the vehicle body, a control link, means pivotally connecting one end of the control link to the upper end of the center rail, a control link extension, means pivotally connecting the other end of the control link and one end of the control link extension, means pivotally connecting the other end of the control link extension to the vehicle body, and means for controlling the pivotal connection between the control link and the control link extension.

2. The invention defined in claim 1 wherein the means for controlling the pivotal connection between the control link and the control link extension comprises a control rod, means pivotally connecting one end of the control rod to the pivotal connection between the control link and the control link extension, and means pivotally connecting the other end of the control rod to the rear rail at a point intermediate the pivotal connections between the rear rail and vehicle and the rear rail and the center rail.

3. The invention defined in claim 2 wherein the length of the control rod and the configuration of the control link are so selected that when the folding top mechanism is in the top extended position the control link rod and the rear rail are in parallel alignment.

References Cited
UNITED STATES PATENTS

| | | | |
|---|---|---|---|
| 2,729,502 | 1/1956 | Hale | 296—117 |
| 3,180,675 | 4/1965 | Adamski | 296—117 |
| 3,252,731 | 5/1966 | Brynn et al. | 296—117 |

BENJAMIN HERSH, *Primary Examiner.*

J. SIEGEL, *Assistant Examiner.*